United States Patent
Chiba

(10) Patent No.: US 10,495,993 B2
(45) Date of Patent: Dec. 3, 2019

(54) TONER FOR DEVELOPING ELECTROSTATIC IMAGES

(71) Applicant: ZEON CORPORATION, Tokyo (JP)

(72) Inventor: Takeru Chiba, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 204 days.

(21) Appl. No.: 15/129,297

(22) PCT Filed: Mar. 26, 2015

(86) PCT No.: PCT/JP2015/059467
§ 371 (c)(1),
(2) Date: Sep. 26, 2016

(87) PCT Pub. No.: WO2015/147208
PCT Pub. Date: Oct. 1, 2015

(65) Prior Publication Data
US 2018/0181013 A1    Jun. 28, 2018

(30) Foreign Application Priority Data
Mar. 27, 2014 (JP) ................. 2014-066466

(51) Int. Cl.
| | | |
|---|---|---|
| G03G 9/097 | (2006.01) | |
| G03G 9/08 | (2006.01) | |
| C01B 33/18 | (2006.01) | |
| C09C 1/30 | (2006.01) | |
| G03G 9/087 | (2006.01) | |
| G03G 9/09 | (2006.01) | |

(52) U.S. Cl.
CPC .............. *G03G 9/08* (2013.01); *C01B 33/18* (2013.01); *C09C 1/30* (2013.01); *G03G 9/0819* (2013.01); *G03G 9/0827* (2013.01); *G03G 9/08711* (2013.01); *G03G 9/0904* (2013.01); *G03G 9/09725* (2013.01)

(58) Field of Classification Search
CPC ................................................ G03G 9/09725
See application file for complete search history.

(56) References Cited

U.S. PATENT DOCUMENTS

| | | | |
|---|---|---|---|
| 4,430,409 A | 2/1984 | Matsumoto et al. | |
| 5,066,558 A * | 11/1991 | Hikake | G03G 9/097 430/108.24 |
| 2002/0061457 A1 | 5/2002 | Okuno et al. | |
| 2008/0070146 A1* | 3/2008 | Fomitchev | B82Y 30/00 430/111.1 |
| 2011/0065035 A1* | 3/2011 | Anno | G03G 9/0821 430/105 |
| 2012/0094230 A1 | 4/2012 | Sakoh | |

FOREIGN PATENT DOCUMENTS

| | | |
|---|---|---|
| JP | 57-78049 A | 5/1982 |
| JP | 57-78549 A | 5/1982 |
| JP | 58-25641 A | 2/1983 |
| JP | S58-186750 A | 10/1983 |
| JP | S62-51464 A | 10/1987 |
| JP | 4-80764 A | 3/1992 |
| JP | 2002-108001 A | 4/2002 |
| JP | 2007-108801 A | 4/2007 |
| JP | 2010-128312 A | 6/2010 |
| WO | 2010/113870 A1 | 10/2010 |

OTHER PUBLICATIONS

English translation of Notification of Transmittal of Translation of the International Preliminary Report on Patentability (Form PCT/IB/338) issued in counterpart International Application No. PCT/JP2015/059467 dated Oct. 6, 2016 with Forms PCT/IB/373 and PCT/ISA/237 (9 pages).
International Search Report dated Jun. 16, 2015, issued in International Application No. PCT/JP2015/059457 (2 pages).

* cited by examiner

*Primary Examiner* — Peter L Vajda
(74) *Attorney, Agent, or Firm* — Westerman, Hattori, Daniels & Adrian, LLP

(57) ABSTRACT

Provided is a toner for developing electrostatic images that has an excellent balance between low-temperature fixability and heat-resistant shelf stability as well as good conveyance amount stability and printing durability, and causes less occurrence of fog in a high temperature and high humidity environment. The toner for developing electrostatic images of the present invention includes colored resin particles containing a binder resin and a colorant, and an external additive, wherein silica fine particles A having a sodium to silicon ratio of 0.1 to 1.8% by mass, are contained as the external additive.

7 Claims, No Drawings

TONER FOR DEVELOPING ELECTROSTATIC IMAGES

TECHNICAL FIELD

The present invention relates to a toner for developing electrostatic images (hereinafter, simply referred to as "toner") which is used to, for example, develop an electrostatic latent image in electrophotography, electrostatic recording, or electrostatic printing, and more particularly relates to a toner for developing electrostatic images having excellent early-stage printing performance and printing durability performance.

BACKGROUND ART

In image forming devices such as an electrophotographic device, an electrostatic recording device, and an electrostatic printing device, an image formation method which forms a desired image by developing an electrostatic latent image to be formed on a photo conductor with a toner for developing electrostatic images is widely performed. The method is applied to a copier, a printer, a facsimile and their composite machines thereof.

For example, in the electrophotographic device using electrophotography, in general, the surf ace of a photoconductor consisting of a photoconductive substance is uniformly charged by various means, and then an electrostatic latent image is formed on the photoconductor. Subsequently, the electrostatic, latent image is developed using a toner, and the toner image is transferred onto a recording material such as a sheet of paper, and the material is heated so as to fix the image, whereby a copy is obtained.

As for the toner used in an image forming device, in order to improve functions such as the charge stability and fluidity of toner, external additives, such as inorganic particles and organic particles having a particle diameter lower than that of colored resin particles (toner particles) are generally attached and added onto the surface of toner particles (external addition) to use.

In the toner obtained using the conventional external additive, it is sometimes hard to obtain a charge rising property of toner at an early stage of printing. Particularly, the charge rising property of toner is easily influenced by the usage environment in a severe environment such as a low temperature and low humidity environment or a high temperature and high humidity environment. As a result, the image quality is easily deteriorated by fog at the early stage, and an adverse effect is given to early-stage printing performance.

In the continuous printing process of a large number of sheets, mechanical stress in a development device (the number of times of contact of toner particles with each other is increased by stirring) causes tendency of burying of an external additive to the toner particle surfaces and/or defects of being liberated (detached) from the toner particle surfaces. It becomes difficult to impart a stable charging ability (charge stability) to the toner particles over time. As a result, thin line reproducibility of printing is decreased and image quality deterioration such as fog is caused. Thus, an adverse effect is given to printing durability performance, which is problematic.

Thus, there is a need for development of a toner in which at an early stage of printing, charge rising property is excellent even in usage in a severe environment, even if the number of times of contact of toner particles with each other is increased by stirring in the development device in the continuous printing process of a large number of sheets, burying of the external additive to the toner particle surfaces and/or defects of being liberated are not caused, a state in which the external additive is appropriately attached is maintained over time, and a stable charging ability (charge stability) can be applied to the toner particles. In the case of having a stable charging ability, even if durable printing is carried out, the change of conveyance property of toner is little, which is advantageous.

Patent Document 1 discloses a positively-chargeable toner comprising toner particles and a dry-type silica fine powder and a wet-type silica fine powder as external additives in order to provide a toner whose image density is stable over a long period of time and which causes no fog even in the case of forming images at a low printing rate, wherein the dry-type silica fine powder has a positively charged polar group and a hydrophobic group, the wet-type silica fine powder has a fluorine-containing negatively charged polar group and is surface treated with a quaternary ammonium salt silane compound.

Patent Document 2 discloses a positively-chargeable toner for developing electrostatic images, comprising colored resin particles and an external additive in order to provide a toner which imparts a stable charging ability and fluidity to toner particles over time, which has thin line reproducibility even if continuous printing of a large number of sheets is performed, and which hardly causes image quality deterioration due to fog in a high temperature and high humidity environment, wherein the toner contains, as an external additive, an external additive A (i.e., fatty acid alkali metal salt particles or fatty acid alkaline earth metal salt particles having a number average primary particle diameter of 0.1 to 1 μm) in an amount of 0.01 to 0.5 part by weight with respect to 100 parts by weight of colored resin particles; and an external additive B (i.e., spherical silica fine particles having a number average primary particle diameter of 40 to 200 nm and a sphericity of 1 to 1.3) in an amount of 0.2 to 2 parts by weight with respect to 100 parts by weight of colored resin particles.

However, the toner disclosed in Patent Document 1 cannot strike a balance between conveyance amount stability and characteristics in a high temperature and high humidity environment, whereas the toner disclosed in Patent Document 2 has excellent characteristics in a high humidity environment but has insufficient conveyance amount stability.

CITATION LIST

Patent Document 1: Japanese Patent Application Laid-Open (JP-A) No. 2007-108801
Patent Document 2: JP-A No. 2010-128312

SUMMARY OF INVENTION

Technical Problem

An object of the present invention is to solve the above problems and to provide a toner for developing electrostatic images that has an excellent balance between low-temperature fixability and heat-resistant shelf stability as well as good conveyance amount stability and printing durability, and causes less occurrence of fog in a high temperature and high humidity environment.

Solution to Problem

The inventor of present invention have examined an influence of the composition of an external additive on toner conveyance amount stability. As a result, they have found that the use of silica fine particles containing a specific amount of sodium element can solve the above problems.

That is, according to the present invention, a toner for developing electrostatic images is provided, comprising colored resin particles containing a binder resin and a colorant, and an external additive, wherein silica fine particles A having a sodium to silicon ratio of 0.1 to 1.8% by mass, are contained as the external additive.

In the present invention, it is preferable that the silica fine particles A have a moisture absorption amount of 0.3 to 1.8% by mass.

In the present invention, it is preferable that the silica fine particles A have a number average primary particle diameter of 20 to 200 nm.

In the present invention, it is preferable that fatty acid metal salt particles C having a number average primary particle diameter of 100 to 2,000 nm, are further contained as the external additive.

In the present invention, it is preferable that surf ace-treated silica fine particles B having a number average primary particle diameter of 7 to 49 nm and a sodium to silicon ratio of 0% or more and less than 0.1% by mass are further contained as the external additive.

In the present invention, it is preferable that a total content of the external additive is 1.6 to 4.0 parts by mass with respect to 100 parts by mass of the colored resin particles.

In the present invention, it is preferable that the colored resin particles are positively charged, and wherein the silica fine particles A are surface treated to be positively charged.

ADVANTAGEOUS EFFECTS OF INVENTION

According to the present invention as described above, silica fine particles A containing a specific amount of sodium element are used as the external additive, whereby there is provided a toner that has an excellent balance between low-temperature fixability and heat-resistant shelf stability as well as good conveyance amount stability and printing durability, and causes less occurrence of fog in a high temperature and high humidity environment.

DESCRIPTION OF EMBODIMENTS

The toner of the present invention is a toner for developing electrostatic images, comprising colored resin particles containing a binder resin and a colorant, and an external additive, wherein silica fine particles A having a sodium to silicon ratio of 0.1 to 1.8% by mass as the external additive.

Hereinafter, the toner of the present invention will be described.

The toner of the present invention contains colored resin particles containing a binder resin and a colorant, and an external additive.

Hereinafter, a method for producing colored resin particles used in the present invention, the colored resin particles obtained by the production method, a method for producing a toner using the colored resin particles, and the toner of the present invention obtained by the production method will be described in this order.

1. Method for Producing Colored Resin Particles

Generally, methods for producing the colored resin particles are broadly classified into dry methods such as a pulverization method and wet methods such as an emulsion polymerization agglomeration method, a suspension polymerization method, and a solution suspension method. The wet methods are preferable since toners having excellent printing characteristics such as image reproducibility can be easily obtained. Among the wet methods, polymerization methods such as the emulsion polymerization agglomeration method and the suspension polymerization method are preferable since toners which have relatively small particle size distribution in micron order can be easily obtained. Among the polymerization methods, the suspension polymerization method is more preferable.

The emulsion polymerization agglomeration method is a method for producing colored resin particles by polymerizing emulsified polymerizable monomers to obtain a resin microparticle emulsion, and aggregating the resultant resin microparticles with a colorant dispersion, etc. The solution suspension method is a method for producing colored resin particles by forming droplets of a solution in an aqueous medium, the solution containing toner components such as a binder resin and a colorant dissolved or dispersed in an organic solvent, and removing the organic solvent. Both methods can be performed by known methods.

The colored resin particles of the present invention can be produced by employing the wet methods or the dry methods. The suspension polymerization method preferable among the wet methods is performed by the following processes.

(A) Suspension Polymerization Method (A-1) Preparation Process of Polymerizable Monomer Composition First, a polymerizable monomer and a colorant as well as other additives such as a charge control agent, which are added if required, are mixed to prepare a polymerizable monomer composition. For example, a media type dispersing machine is used for the mixing upon preparing the polymerizable monomer composition.

In the present invention, the polymerizable monomer means a monomer having a polymerizable functional group, and the polymerizable monomer is polymerizable to be a binder resin. It is preferable to use a monovinyl monomer as a main component of the polymerizable monomer. Examples of the monovinyl monomer include styrene; styrene derivatives such as vinyltoluene and α-methylstyrene; acrylic acid and methacrylic acid; acrylic acid esters such as methyl acrylate, ethyl acrylate, propyl acrylate, butyl acrylate, 2-ethylhexyl acrylate and dimethylaminoethyl acrylate; methacrylic acid esters such as methyl methacrylate, ethyl methacrylate, propyl methacrylate, butyl methacrylate, 2-ethylhexyl methacrylate and dimethylaminoethyl methacrylate; nitryl compounds such as acrylonitrile and methacrylonitrile; amide compounds such as acrylamide and methacrylamide; and olefins such as ethylene, propylene and butylene. These monovinyl monomers may be used alone or in combination of two or more kinds. Among them, it is preferable to use styrene, a styrene derivative, acrylic acid ester or methacrylic acid ester as a monovinyl monomer, In order to improve the hot offset and shelf stability, it is preferable to use any crosslinkable polymerizable monomer together with the monovinyl monomer. The crosslinkable polymerizable monomer means a monomer having two or more polymerizable functional groups. Examples of the crosslinkable polymerizable monomer include: aromatic divinyl compounds such as divinyl benzene, divinyl naphthalene and derivatives thereof; ester compounds such as ethylene glycol dimethacrylate and diethylene glycol dimethacrylate, in which two or more carboxylic acids having a carbon-carbon double bond are esterified to alcohol having two or more hydroxyl groups; other divinyl compounds such as N,N-divinylaniline and divinyl ether; and compounds having three or more vinyl groups. These crosslinkable polymerizable monomers can be used alone or in combination of two or more kinds.

In the present invention, it is desirable that the amount of the crosslinkable polymerizable monomer to be used is generally from 0.1 to 5 parts by mass, preferably from 0.3 to 2 parts by mass, with respect to 100 parts by mass of the monovinyl monomer.

Further, the use of a macromonomer as a part of the polymerizable monomer achieves a good balance between the shelf stability and low-temperature fixability of the toner to be obtained, which is preferred. The macromonomer has a polymerizable carbon-carbon unsaturated double bond at the end of the molecular chain and is a reactive oligomer or polymer which usually has a number average molecular weight of 1,000 to 30,000. It is preferable that the macromonomer can form a polymer having a glass transition temperature (hereinafter sometimes referred to as "Tg") higher than that of a polymer obtained by polymerizing a monovinyl monomer.

It is desirable that the used amount of the macromonomer is preferably from 0.03 to 5 parts by mass, more preferably 0.05 to 1 part by mass with respect to 100 parts by mass of the monovinyl monomer.

In the present invention, a colorant is used. To produce a color toner, a black colorant, a cyan colorant, a yellow colorant and a magenta colorant can be used.

Examples of the black colorant to be used include carbon black, titanium black and magnetic powder such as zinc-iron oxide and nickel-iron oxide.

Examples of the cyan colorant to be used include copper phthalocyanine compounds, derivatives thereof and anthraquinone compounds. The specific examples include C. I. Pigment Blue 2, 3, 6, 15, 15:1, 15:2, 15:3, 15:4, 16, 17:1 and 60.

Examples of the yellow colorant to be used include compounds including azo pigments such as monoazo pigments and. disazo pigments and condensed polycyclic pigments. The specific examples include C. I. Pigment Yellow 3, 12, 13, 14, 15, 17, 62, 65, 73, 74, 83, 93, 97, 120, 138, 155, 180, 181, 185, 186 and 213.

Examples of the magenta colorant to be used include compounds including azo pigments such as monoazo pigments and disazo pigments and condensed polycyclic pigments. The specific examples include C. I. Pigment Red 31, 48, 57:1, 58, 60, 63, 64, 68, 81, 83, 37, 88, 89, 90, 112, 114, 122, 123, 144, 146, 149, 150, 163, 170, 184, 185, 187, 202, 206, 207, 209, 237, 238, 251, 254, 255 and 269 and C. I. Pigment Violet 19.

In the present invention, these colorants can be used alone or in combination of two or more kinds. The amount of the colorant is preferably from 1 to 10 parts by mass with respect to 100 parts by mass of the monovinyl monomer.

From the viewpoint of improving the releasing characteristics of the toner from a fixing roller at fixing, the release agent is added to the polymerizable monomer composition as another additive. The release agent can be used without any particular limitation as long as it is generally used as a release agent for the toner.

The release agent preferably contains at least one of an ester wax or hydrocarbon wax. The use of these waxes as the release agents allows the balance between low-temperature fixability and shelf stability to be improved.

The ester wax suitably used as the release agent in the present invention is more preferably a polyfunctional ester wax. Examples thereof include pentaerythritol ester compounds such as pentaerythritol tetrapalmitate, pentaerythritol tetrabehenate, pentaerythritol tetrastearate; glycerin ester compounds such as hexaglycerin tetrabehenate tetrapalmitate, hexaglycerin octabehenate, pentaglycerin heptabehenate, tetraglycerin hexabehenate, triglycerin pentabehenate, diglycerin tetrabehenate and glycerintribehenate; and dipentaerythritol ester compounds such as dipentaerythritol hexamyristate and dipentaerythritol hexapalmitate. Among them, preferred is a dipentaerythritol ester compound. More preferred is dipentaerythritol hexamyristate.

Examples of the hydrocarbon wax suitably used as the release agent in the present invention include a polyethylene wax, a polypropylene wax, a Fischer-Tropsch wax, and a petroleum wax. Among them, preferred are a Fischer-Tropsch wax and a petroleum wax, more preferred is a petroleum wax.

The number average molecular weight of the hydrocarbon wax is preferably 300 to 800, more preferably 400 to 600. The penetration of the hydrocarbon wax measured in accordance with JIS K2235 5.4 is preferably 1 to 10, more preferably 2 to 7.

In addition to the release agents, natural waxes such as jojoba wax; and mineral waxes such as ozokerite can be used.

The release agent may be used in combination with one or two or more kinds of the waxes.

The amount of the release agent to be used is preferably 0.1 to 30 parts by mass, more preferably 1 to 20 parts by mass, with respect to 100 parts by mass of the monovinyl monomer.

In order to improve the charging ability of the toner, a charge control agent having positively charging ability or negatively charging ability can be used as another additive.

The charge control agent is not particularly limited as long as it is generally used as a charge control agent for toner. Among charge control agents, a charge control resin having positively charging ability or negatively charging ability is preferred since the charge control resin is highly compatible with the polymerizable monomer and can impart stable charging ability (charge stability) to the toner particles. From the viewpoint of obtaining a positively-chargeable toner, the charge control resin having positively charging ability is more preferably used.

Examples of the charge control agent having positively charging ability include a nigrosine dye, a quaternary ammonium salt, a triaminotriphenylmethane compound, an imidazole compound, a polyamine resin as a charge control resin preferably used, a copolymer having a quaternary ammonium group, and a copolymer having a quaternary ammonium salt group.

Examples of the charge control agent having negatively charging ability include azo dyes containing metals such as Cr, Co, Al and Fe, salicylic acid metal compounds and alkyl salicylic acid metal compounds as well as charge control resins to be preferably used such as sulfonic acid group-containing copolymers, sulfonic acid salt group-containing copolymers, carboxylic: acid group-containing copolymers and carboxylic acid salt group-containing copolymers.

In the present invention, it is preferable to usually use a charge control agent in an amount of 0.01 to 10 parts by mass, preferably in an amount of 0.03 to 8 parts by mass with respect to 100 parts by mass of the monovinyl monomer. If the added amount of the charge control agent is less than 0.01 parts by mass, fog may occur. On the other hand, if the added amount of the charge control agent exceeds 10 parts by mass, printing soiling may occur.

As one of other additives, a molecular weight modifier is preferably used upon the polymerization of the polymerizable monomer which is polymerized to be a binder resin.

The molecular weight modifier is not particularly limited as long as it is generally used as a molecular weight modifier for a toner. Examples of the molecular weight modifier include: mercaptans such as t-dodecyl mercaptan, n-dodecyl mercaptan, n-octyl mercaptan and 2, 2, 4, 6, 6-pentamethylheptane-3-thiol; and thiuram disulfides such as tetramethyl thiuram disulfide, tetraethyl thiuram disulfide, tetrabutyl thiuram disulfide, N,N'-dimethyl-N,N'-diphenyl thiuram disulfide and N,N'-dioctadecyl-N,N'-diisopropyl thiuram disulfide. These molecular weight modifiers may be used alone or in combination of two or more kinds.

In the present invention, it is desirable that the amount of the molecular weight modifier to be used is generally 0.01 to 10 parts by mass, more preferably 0.1 to 5 parts by mass, with respect to 100 parts by mass of the monovinyl monomer.

(A-2) Suspension Process of Obtaining Suspension (Droplets Forming Process)

In the present invention, it is preferable that the polymerizable monomer composition comprising at least a polymerizable monomer and a colorant is dispersed, preferably in an aqueous medium containing a dispersion stabilizer, and a polymerization initiator is added therein. Then, the droplets of the polymerizable monomer composition are preferably formed. The method for forming droplets is not particularly limited. The droplets are formed, for example, by means of a device capable of strong stirring such as an in-line type emulsifying and dispersing machine (product name: MILDER; manufactured by Pacific Machinery & Engineering Co., Ltd), and a high-speed emulsification dispersing machine (product name: T. K. HOMOMIXER MARK II; manufactured by PRIMIX Corporation).

Examples of the polymerization initiator include: persulfates such as potassium persulfate and ammonium persulfate; azo compounds such as 4,4'-azobis(4-cyanovaleric acid), 2,2'-azobis(2-methyl-N-(2-hydroxyethyl)propionamide), 2,2'-azobis(2-amidinopropane)dihydrochloride, 2,2'-azobis(2,4-dimethylvaleronitrile) and 2,2'-azobisisobutyronitrile; and organic peroxides such as di-t-butylperoxide, benzoyl peroxide, t-butylperoxy-2-ethylhexanoate, t-butylperoxydiethylacetate, t-hethylperoxy-2-ethylbutanoate, diisopropylperoxydicarbonate, di-t-butylperoxyisophthalate and t-butylperoxyisobutyrate. These can be used alone or in combination of two or more kinds. Among them, the organic peroxides are preferably used since they can reduce residual polymerizable monomer and can impart excellent printing durability.

Among the organic peroxides, preferred are peroxy esters, and more preferred are non-aromatic peroxy esters, i.e. peroxy esters having no aromatic ring, since they have excellent initiator efficiency and can reduce a residual polymerizable monomer.

The polymerization initiator may be added after dispersing the polymerizable monomer composition to the aqueous medium and before forming droplets as described above, or may be added to the polymerizable monomer composition before the polymerizable monomer composition is dispersed in the aqueous medium.

The added amount of the polymerization initiator used in the polymerization of the polymerizable monomer composition is preferably 0.1 to 20 parts by mass, more preferably 0.3 to 15 parts by mass, further more preferably 1 to 10 parts by mass, with respect to 100 parts by mass of the monovinyl monomer.

In the present invention, the aqueous medium means a medium containing water as a main component.

In the present invention, the dispersion stabilizer is preferably added to the aqueous medium. Examples of the dispersion stabilizer include: inorganic compounds including sulfates such as barium sulfate and calcium sulfate; carbonates such as barium carbonate, calcium carbonate and magnesium carbonate; phosphates such as calcium phosphate; metal oxides such as aluminum oxide and titanium oxide; and metal hydroxides such as aluminum hydroxide, magnesium hydroxide and iron(II) hydroxide; and organic compounds including water-soluble polymers such as polyvinyl alcohol, methyl cellulose and gelatin; anionic surfactants; nonionic surfactants; and ampholytic surfactants. These dispersion stabilizers can be used alone or in combination of two or more kinds.

Among the above dispersion stabilizers, colloid of inorganic compounds, particularly hardly water-soluble metal hydroxide, is preferable. By using the colloid of inorganic compounds, particularly hardly water-soluble metal hydroxide, the colored resin particles can have a small particle size distribution, so that the amount of the dispersion stabilizer remained after washing is small, thus the image can be clearly reproduced by the toner to be obtained; moreover, environmental stability can be excellent.

(A-3) Polymerization Process

After the droplets are formed as described in the above (A-2), thus obtained aqueous dispersion medium is heated to polymerize. Thereby, an aqueous dispersion of colored resin particles is formed.

The polymerization temperature of the polymerizable monomer composition is preferably 50° C. or more, more preferably 60 to 95° C. The polymerization reaction time is preferably 1 to 20 hours, more preferably 2 to 15 hours.

The colored resin particle may be used as a polymerized toner obtained by adding an external additive. It is preferable that the colored resin particle is so-called core-shell type (or "capsule type") colored resin particle which is obtained by using the colored resin particle as a core layer and forming a shell layer, a kind of which is different from that of the core layer, around the core layer. The core-shell type colored resin particles can take a balance of lowering fixing temperature and prevention of blocking at storage, since the core layer including a substance having a low softening point is covered with a substance having a higher softening point.

A method for producing the above-mentioned core-shell type colored resin particles using the colored resin particles is not particularly limited, and can be produced by any conventional method. The in situ polymerization method and the phase separation method are preferable from the viewpoint of production efficiency.

A method for producing the core-shell type colored resin particles according to the in situ polymerization method will be hereinafter described.

A polymerizable monomer for forming a shell layer (a polymerizable monomer for shell) and a polymerization initiator are added to an aqueous medium to which the colored resin particles are dispersed followed by polymerization, thus the core-shell type colored resin particles can be obtained.

As the polymerizable monomer for shell, the above-mentioned polymerizable monomer can be similarly used. Among the polymerizable monomers, any of monomers which provide a polymer having Tg of more than 80° C. such as styrene, acrylonitrile and methyl methacrylate is preferably used alone or in combination of two or more kinds.

Examples of the polymerization initiator used for polymerization of the polymerizable monomer for shell include: water-soluble polymerization initiators including metal persulfates such as potassium, persulfate and ammonium persulfate; and azo-type initiators such as 2,2'-azobis(2-methyl-N-(2-hydroxyethyl)propionamide) and 2,2'-azobis(2-methyl-N-(1,1-bis(hydroxymethyl)-2-hydroxyethyl) propionamide). These polymerization initiators can be used alone or in combination of two or more kinds. The amount of the polymerization initiator is preferably 0.1 to 30 parts by mass, more preferably 1 to 20 parts by mass, with respect to 100 parts by mass of the polymerizable monomer for shell.

The polymerization temperature of the shell layer is preferably 50° C. or more, more preferably 60 to 95° C. The polymerization reaction time is preferably 1 to 20 hours, more preferably 2 to 15 hours.

(A-4) Processes of Washing, Filtering, Dehydrating and Drying

It is preferable that the aqueous dispersion of the colored resin particles obtained by the polymerization is subjected to operations including filtering, washing for removing the dispersion stabilizer, dehydrating, and drying several times as needed after the polymerization, according to any conventional method.

In the washing method, if the inorganic compound is used as the dispersion stabilizer, it is preferable that acid or alkali is added to the aqueous dispersion of colored resin particles; thereby, the dispersion stabilizer is dissolved in water and removed, if colloid of hardly water-soluble inorganic hydroxide is used as the dispersion stabilizer, it is preferable to control pH of the aqueous dispersion of colored resin particles to 6.5 or less. Examples of the acid to be added include inorganic acids such as sulfuric acid, hydrochloric acid and nitric acid, and organic acids such as formic acid and acetic acid. Particularly, sulfuric acid is suitable for high removal efficiency and small impact on production facilities.

The methods for dehydrating and filtering are not particularly limited, and any of various known methods can be used. A centrifugal filtration method, a vacuum filtration method and a pressure filtration method can be used. Also, the drying method is not particularly limited, and any of various methods can be used.

(B) Pulverization Method

In the case of producing the colored resin particles by employing the pulverization method, the following processes are performed.

First, a binder resin, a colorant, and other additives such as a charge control agent etc., which are added if required, are mixed by means of a mixer such as a ball mill, a V type mixer, FM mixer (product name, manufactured by NIPPON COKE & ENGINEERING. CO., LTD. ), a high-speed dissolver or an internal mixer. Next, the above-obtained mixture is kneaded while heating by means of a press kneader, a twin screw kneading machine or a roller. The obtained kneaded product is coarsely pulverized by means of a pulverizer such as a hammer mill, a cutter mill or a roller mill, followed by finely pulverizing by means of a pulverizer such as a jet mill or a high-speed rotary pulverizer, and classifying into desired particle diameters by means of a classifier such as a wind classifier or an airflow classifier. Thus, colored resin particles produced by the pulverization method can be obtained.

Incidentally, the binder resin, the colorant and other additives such as the charge control agent etc., which are added if required, used in "(A) Suspension polymerization method" can be used in the pulverization method. Similarly as the colored resin particles obtained by "(A) Suspension polymerization method", the colored resin particles obtained by the pulverization method can also be in a form of the core-shell type colored resin particles produced by a method such as the in situ polymerization method.

As the binder resin, other resins which are conventionally and broadly used for toners can be used. Specific examples of the binder resin used in the pulverization method include polystyrene, styrene-butyl acrylate copolymers, polyester resins and epoxy resins.

2. Colored Resin Particles

The colored resin particles are obtained by the above production method such as (A) Suspension polymerization method or (B) Pulverization method.

Hereinafter, the colored resin particles constituting the toner will be described. The colored resin particles hereinafter include both core-shell type colored resin particles and colored resin particles which are not core-shell type.

The volume average particle diameter (Dv) of the colored resin particles is preferably 4 to 12 μm, more preferably 5 to 10 μm. If the volume average particle diameter (Dv) of the colored resin particles is less than 4 μm, the flowability of the polymerized toner may lower, the transferability may deteriorate, and the image density may decrease. If the volume average particle diameter (Dv) of the colored resin particles exceeds 12 μm, the resolution of images may decrease.

As for the colored resin particles, a ratio (Dv/Dn) of the volume average particle diameter (Dv) and the number average particle diameter (Dn) is preferably 1.00 to 1.20, more preferably 1.00 to 1.15. If "Dv/Dn" exceeds 1.20, the transferability, image density and resolution may decrease. The volume average particle diameter and the number average particle diameter of the colored resin particles can be measured, for example, by means of a particle diameter measuring device (product name: MULTISIZER; manufactured by Beckman Coulter, Inc.), etc.

3. Method for Producing a Toner of the Present Invention

The colored resin particles described above are mixed and agitated together with an external additive; thus, the external additive is uniformly and suitably attached (externally added) on the surface of the colored resin particles. The one-component toner may be mixed and agitated together with carrier particles to form a two-component toner.

The agitator for adding an external additive to colored resin particles is not particularly limited as long as it is an agitator capable of attaching the external additive on the surface of the colored resin particles. The examples include agitators capable of mixing and agitating such as FM Mixer (product name; manufactured by NIPPON COKE & ENGINEERING CO., LTD.), SUPER MIXER (product name; manufactured by KAWATA Manufacturing Co., Ltd.), Q MIXER (product name; manufactured by NIPPON COKE & ENGINEERING CO., LTD.), Mechanofusion system (product name; manufactured by Hosokawa Micron Corporation) and MECHANOMILL (product name; manufactured by Okada Seiko Co., Ltd.)

The silica fine particles A used in the present invention have a sodium to silicon ratio of 0.1 to 1.8% by mass. As the silica fine particles A, commercially available wet silica fine powders or dry silica fine powders, or wet silica fine powders or dry silica fine powders prepared by any known production method may be used. It is preferable to use wet silica fine powders. The known production method is, for example, a method for producing silica fine particles A from a silica-based particle dispersion.

Examples of the method for producing silica fine particles A from a silica-based particle dispersion include the following methods (1) to (4), but are not limited thereto.

(1) Silica fine particles A can be produced by a method comprising the steps of: contacting an aqueous solution of alkali silicate (silica concentration: 3 to 10% by mass) selected from the group consisting of alkali metal silicate, tertiary ammonium silicate, quaternary ammonium silicate and guanidine silicate with an H-type strong acidic cation exchange resin to be dealkalized; contacting the solution with an OH-type strong basic anion exchange resin, if necessary, to be deanionized, to prepare an active silica; adding an alkali substance to adjust the pH to 8 or more; heating the resultant mixture to 50° C. or more to produce a silica sol; and drying the silica sol.

(2) Silica fine particles A can be produced by a method comprising the steps of: dispersing conventionally known silica fine particles in water to obtain a nuclear particle dispersion containing 0.005 to 20% by mass of $SiO_2$; adding alkaline silicates other than potassium silicate (potassium water glass) and sodium silicate (sodium water glass), if necessary; adding an acidic silicate solution to perform particle growth of nuclear particles to produce a silica sol; and drying the silica sol.

(3) Silica fine particles A can be produced by a method comprising the steps of: neutralizing the prepared alkali silicate solution described above, with an acid to obtain a silica hydrogel; washing the silica hydrogel to remove salts; producing a silica sol by deflocculating the silica hydrogel by adding an alkali and heating to the range of 60 to 200° C.; and drying the silica sol.

(4) Silica fine particles A can be produced by a method comprising the steps of: adding a silicon compound having a hydrolytic group such as tetraethoxy silane to a dispersion having nuclear particles; hydrolyzing the resultant mixture to attach silica onto the nuclear particles; performing particle growth to produce a silica sol; and drying the silica sol.

A silica fine particle dispersion (silica sol) is adjusted to have a solid content concentration of 10 to 25 % by mass, and also subjected to hydrothermal treatment at a temperature of 130 to 300° C. for 3 to 20 hours. The hydro thermal treatment causes dissolution of the silica surface and precipitation of silicate oligomers on a convexo-concaved portion of the particle surface, whereby the surface is modified and the surface smoothing is accelerated. Along with this change, the conversion of particles to a spherical shape is also accelerated.

The adjustment of the ratio of sodium is performed in mainly the step of removing sodium ions. The sodium ions can be removed by various controls such as the type of cation exchange resin, and the number of times of passing liquid. It is preferable to adjust the ratio of sodium using a passing liquid rate which is relatively simple to control.

The silica fine particles A used in the present invention have a sodium to silicon ratio of 0.1 to 1.8% by mass, and the ratio is preferably 0.3 to 1.5% by mass, more preferably 0.5 to 1.0% by mass.

Known methods may be used to measure the ratio of sodium of silica fine particles A. The ratio of sodium of silica fine particles A can be measured using, for example, an X-ray fluorescence spectrometer (XRF) or an inductively coupled plasma atomic emission spectrophotometer (ICP-AES).

In both of these methods, an elementary substance of silica is measured and the sodium to silicon ratio can be analyzed based on the following formula.

The silica fine particles A are preferably surface treated and more preferably surface treated to be hydrophobic. In the case of the positively-chargeable toner, the silica fine particles A is more preferably surface treated to be positively charged. In the surface treatment of the silica fine particles A, a general hydrophobizing agent having no charging group may also be used in order to adjust hydrophobicity and/or positively charging ability. The silica fine particles A are preferably subjected to hydrophobizing treatment with a silicon compound, and more preferably subjected to hydrophobizing treatment with two or more kinds of silicon compounds. In the case of hydrophobizing treatment with two or more kinds of silicon compounds, in order to impart high positively charging ability, it is preferable that at least one of the two or more silicon compounds is a silicon compound containing an amino group, and the other of the silicon compounds is a silicon compound containing no amino group.

Various types of the amino group-containing silicon compounds may be used without particular restrictions. For example, an amino group-containing silane coupling agent, an amino modified silicone oil, a quaternary ammonium salt-based silane and a cyclic silazane may be used. Among them, the amino group-containing silane coupling agent is particularly preferred from the viewpoint of positive charge imparting ability and fluidity. Specific examples of the amino group-containing silane coupling agent include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane and N-phenyl-3-aminopropyltriethoxysilane. Among them, the amino alkyl group-containing silane coupling agent is preferred because the improvement effect of the environmental stability of the charging performance is excellent.

Various types of the silicon compounds containing no amino group may be used without particular restrictions as long as they contain no amino group and have hydrophobicity. From the viewpoint of the environmental stability of charging performance and the fluidity, for example, an alkoxysilane, a silane coupling agent, a silazane, a silicone oil and a silicone resin are preferred. Particularly, the alkoxysilane, silicone oil, and silicone resin are preferred. Examples of the alkoxysilane include isobutyltrimethoxysilane, octyltriethoxysilane and trifluoropropyltrimetoxysiiane. Examples of the silazane include hexamethyldisilazane. Examples of the silicone oil include straight silicone oils such as dimethylpolysiloxane and methylhydrogenpolysiloxane; and modified silicone oils such as epoxy-modified silicone oil and fluorine-modified silicone oil. Examples of the silicone resin include trimethylsiloxysilicic acid.

The adjustment of the moisture absorption amount can be controlled by the amount of the hvdrophobizing agent used for hydrophobizing.

The silica fine particles A preferably have a moisture absorption amount of 0.3 to 1.8% by mass, more preferably a moisture absorption amount of 0.4 to 1.6% by mass, further more preferably a moisture absorption amount of 0.5 to 1.0% by mass, when the total mass of the silica fine particles A is 100% by mass. If the moisture absorption amount of the silica fine particles A exceeds outside the above range, a decrease in charging ability may be caused and filming to a photo conductor may be generated.

The moisture absorption amount of the silica fine particles A can be measured using an adsorption-desorption analyzer, a continuous vapor absorber, for example.

Preferably, the silica fine particles A have a number average primary particle diameter of 20 to 200 nm. If the number average primary particle diameter of the silica fine particles A is less than 20 nm, the spacer effect is reduced, the silica fine particles B described below are easily buried from the surface of the colored resin particles to the inside, which may cause adverse effects on the printing performance such as occurrence of fog. On the other hand, if the number average primary particle diameter of the silica fine particles A exceeds 200 nm, the silica fine particles A are easily liberated from the surface of toner particles and the function as the external additive is reduced, which may cause adverse effects on the printing performance.

The silica fine particles A have preferably a number average primary particle diameter of 40 to 150 nm, more preferably 50 to 120 nm.

The number average primary particle diameter of the silica fine particles A is preferably larger than that of the silica fine particles B.

The content of the silica fine particles A is generally 0.2 to 5.0 parts by mass, preferably 0.5 to 4.0 parts by mass, more preferably 0.7 to 3.0 parts by mass with respect to 100 parts by mass of the colored resin particles.

If the content of the silica fine particles A is less than 0.2 part by mass, the function as the external additive is not sufficiently exerted. This may cause adverse effects on the printing performance. On the other hand, if the content of the silica fine particles A exceeds 5.0 parts by mass, the silica fine particles A are easily liberated from the surface of toner particles and the liberated external additive is attached to members in a development device. This may cause adverse effects on the printing performance.

In the present invention, the silica fine particles A are used as the external additive, whereby the conveyance amount stability of the toner is increased, and the printing durability is also improved.

The term "conveyance amount stability" used herein means toner characteristics in which the amount of the toner conveyed from the development device (conveyance amount) is stable to an increase in stirring frequency corresponding to the number of printing sheets. The toner may be aggregated by the stirring step. On the other hand, it is a rare case that the toner is refined by the stirring step. Usually, the conveyance amount increases as the number of times of stirring of the toner increases.

An example of the method for measuring the conveyance amount will be described below. First, a predetermined number of sheets was printed and then white solid pattern is printed using a printer in a normal temperature and normal humidity (N/N) environment (e.g., at a temperature of 23° C. and a humidity of 50%). Then, white solid pattern is printed on a second sheet, and printing was stopped in the middle. After that, as for the toner attached on the developing roll, the mass of the suctioned toner and the area of the suctioned toner were measured using a suction-type charge amount measurement device (product name: 210HS-2A, manufactured by TREK Japan KK). Based on the mass and the area of the suctioned toner, the conveyance amount (mg/cm$^2$) on the developing roll is calculated from Calculation formulae 1 and 2:

area (cm$^2$) on developing roll=(radius (cm) of suction trace)$^2$×Π×number of suction traces  Calculation formula 1 conveyance amount (mg/cm$^2$) on developing roll=mass (mg) of captured toner/area (cm$^2$) on developing roll  Calculation formula 2

The conveyance amount stability is represented by a value obtained by dividing the conveyance amount after durable printing by the standard conveyance amount, as shown in the following calculation formula 3. Here, the "standard conveyance amount" is a conveyance amount used as a stability criterion and mainly means an early-stage conveyance amount of toner. The conveyance amount after durable printing means a conveyance amount after the completion of printing of a large number of sheets.

conveyance amount stability=conveyance amount after durable printing/standard conveyance amount  Calculation formula 3

Usually, since the conveyance amount after durable printing becomes more than or equal to the standard conveyance amount, the conveyance amount stability becomes a value of 1 or more. As the value of conveyance amount stability is close to 1, the conveyance amount is not changed after printing of a large number of sheets, which indicates that toner characteristics to an increase in stirring frequency is stable. On the other hand, a larger value of conveyance amount stability indicates that the conveyance amount of toner increases too much after printing of a large number of sheets, and indicates that toner characteristics to the stirring step are instable. Thus, the conveyance amount stability is one of the indicators of changes in toner characteristics depending on the stirring frequency.

The conveyance amount after durable printing is examined by dividing into a conveyance amount before the end of printing (end-stage conveyance amount) and a conveyance amount when the number of printed sheets reaches half thereof (middle-stage conveyance amount). Here, when the standard conveyance amount is defined as the conveyance amount in an early stage of the toner conveyance (early-stage conveyance amount), the conveyance amount stability (middle-stage) at the middle-stage conveyance amount and the conveyance amount stability (end-stage) at the end-stage conveyance amount are as shown in the following calculation formulae 3a and 3b:

conveyance amount stability (middle-stage)=middle-stage conveyance amount/early-stage conveyance amount  Calculation formula 3a conveyance amount stability (end-stage)=end-stage conveyance amount/early-stage conveyance amount  Calculation formula 3b As described above, the conveyance amount increases depending on the number of times of stirring of the toner. Thus, the early-stage conveyance amount, the middle-stage conveyance amount, and the end-stage conveyance amount usually increases in this order. Therefore, the conveyance amount stability (end-stage) is usually a value higher than the conveyance amount stability (middle-stage).

The conveyance amount stability (middle-stage) is an indicator of changes in toner characteristics depending on the stirring frequency in the middle-stage of printing (half of the number of printing sheets to be desired). Specifically, if the value of conveyance amount stability (middle-stage) is 1.5 or more, the conveyance amount of toner increases to 1.5-fold or more as compared to that of the early stage. Accordingly, it is clear that it is not possible to stably maintain the toner characteristics in the printing environment. It can be said that the printing may be finished.

On the other hand, the conveyance amount stability (end-stage) is an indicator of changes in toner characteristics depending on the stirring frequency in the end-stage of printing (the number of printing sheets to be desired). Specifically, if the value of conveyance amount stability (end-stage) is 2.0 or more, the conveyance amount of toner increases to 2.0-fold or more as compared to that of the early stage. This shows that it is difficult to print a number of sheets more than the above number of sheets.

As described above, the conveyance amount stability (middle-stage) and the conveyance amount stability (end-stage) are indicators closely associated with, particularly the printing durability of the toner.

In the present invention, it is preferable that silica fine particles B having a number average primary particle diameter of 7 to 49 nm are further contained as the external additive. The "silica fine particles B" used in the present invention are silica fine particles having a sodium to silicon ratio of 0% by mass or more and less than 0.1% by mass.

The silica fine particles B used in the present invention has preferably a sodium to silicon ratio of 0 to 0.08% by mass, more preferably 0 to 0.05% by mass. In the present invention, the sodium to silicon ratio is calculated by measuring the silicon content and the sodium content in the silica fine particles with a scanning X-ray fluorescence spectrometer as described in the following examples. If the sodium content is equal to or less than the detection limit, the sodium to silicon ratio is deemed to be 0% by mass.

If the number average primary particle diameter of the silica fine particles B is less than 7 nm, the silica fine particles B are easily buried from the surface of the colored resin particles to the inside. If the number of printed sheets is large, it is not possible to sufficiently impart fluidity to the toner particles. This may cause adverse effects on the printing performance. On the other hand, if the number average primary particle diameter of the silica fine particles B exceeds 49 nm, the proportion of inorganic particles B to the toner particle surfaces (coverage) is reduced. Thus, it is not possible to sufficiently impart fluidity to the toner particles.

The silica fine particles B have preferably a number average primary particle diameter of 10 to 40 nm, more preferably 12 to 30 nm.

As described above, it is preferable that the number average primary particle diameter of the silica fine particles B is smaller than that of the silica fine particles A.

The content of the silica fine particles B is generally from 0.1 to 2.0 parts by mass, preferably 0.3 to 1.2 parts by mass, more preferably 0.4 to 0.8 part by mass with respect to 100 parts by mass of the colored resin particles.

If the content of the silica fine particles B is less than 0.1 part by mass, the function as the external additive is not sufficiently exerted. Thus, the fluidity may be reduced, and the shelf stability and durability may be lowered. On the other hand, if the content of the silica fine particles B exceeds 2.0 parts by mass, the silica fine particles B are easily liberated from the surface of toner particles, and the charging ability in a high temperature and high humidity environments decreases and fog occurs.

The silica fine particles B are preferably surface treated, and more preferably surface treated with a hydrophobizing agent having a positively chargeable functional group. The details of the surface treatment of the silica fine particles B are the same as those of the surface treatment of the silica fine particles A as described above.

Usable silica fine particles B include various types of commercially available products. Examples thereof include HDK2150 (product name, number average primary particle diameter: 12 nm), manufactured by Clariant; RX50 (product name, number average primary particle diameter: 40 nm), NA50Y (product name, number average primary particle diameter: 35 nm), NA130Y (product name, number average primary particle diameter: 20 nm), R504 (product name, number average primary particle diameter: 12 nm), RX200 (product name, number average primary particle diameter: 12 nm), and RY300 (product name, number average primary particle diameter: 7 nm), all manufactured by Nippon Aerosil Co., Ltd.; MSP-012 (product name, number average primary particle diameter: 16 nm) and MSN-004 (product name, number average primary particle diameter: 16 nm), all manufactured by TAYCA; and TG-7120 (product name, number average primary particle diameter: 20 nm) and TG820F (product name, number average primary particle diameter: 7 nm), all manufactured by Cabot.

In the present invention, it is preferable that fatty acid metal salt particles C having a number average primary particle diameter of 100 to 2,000 nm are further contained as the external additive. If the number average primary particle diameter of the fatty acid metal salt particles C. is less than 100 nm, the charging ability of the toner decreases and fog may occur. On the other hand, if the number average primary particle diameter of the fatty acid metal salt particles C exceeds 2,000 nm, white patches may be generated on the printed image.

The fatty acid metal salt particles C have preferably a number average primary particle diameter of 500 to 1,500 nm, more preferably 800 to 1,000 nm.

Examples of the metal comprising a metal salt of fatty acid include Li, Na, K, Rb, Cs, Be, Mg, Ca, Sr, Ba and Zn.

The fatty acid (R—COOH) which corresponds to the fatty acid site (R—COO$^-$) of the metal salt of fatty acid encompasses, of carboxylic acids (R—COOH) having a carboxyl group (—COOH), all carboxylic acids having a chain structure. In the present invention, the fatty acid site is preferably one derived from a higher fatty acid in which the alkyl group (R—) has a large number of carbons.

Examples of the higher fatty acid (R—COOH) include lauric acid ($CH_3(CH_2)_{10}COOH$), tridecane acid ($CH_3(CH_2)_{11}COOH$), myristic acid ($CH_3(CH_2)_{12}COOH$), pentadecanoic acid ($CH_3(CH_2)_{13}COOH$), palmitic acid ($CH_3(CH_2)_{14}COOH$), heptadecanoic acid ($CH_3(CH_2)_{15}COOH$), stearic acid ($CH_3(CH_2)_{16}COOH$), arachidic acid ($CH_3(CH_2)_{18}COOH$), behenic acid ($CH_3(CH_2)_{20}COOH$) and lignoceric acid ($CH_3(CH_2)_{22}COOH$).

Specifically, typical examples of the metal salt of fatty acid include metal laurates such as lithium laurate, sodium laurate, potassium laurate, magnesium laurate, calcium laurate and barium laurate; metal myristates such as lithium myristate, sodium myristate, potassium myristate, magnesium myristate, calcium myristate and barium myristate; metal palmitates such as lithium palmitate, sodium palmitate, potassium palmitate, magnesium palmitate, calcium palmitate and barium palmitate; and metal stearates such as lithium stearate, sodium stearate, potassium stearate, magnesium stearate, calcium stearate, barium stearate and zinc stearate. Among them, metal stearates are preferred, and zinc stearate is more preferred.

The amount of the fatty acid metal salt particles C to be suitably used as the external additives in the present invention is preferably 0.01 to 1 part by mass, more preferably 0.03 to 0.3 part by mass with respect to 100 parts by mass of colored resin particles.

As the fatty acid metal salt particles C, various types of commercial products may be used. Examples thereof include the following products manufactured by Sakai Chemical Industry Co., Ltd.: SPL-100F (product name, lithium stearate, number average primary particle diameter: 0.71 μm), SPX-100F (product name, magnesium stearate, number average primary particle diameter: 0.72 μm), SPC-100F (product name, calcium stearate, number average primary particle diameter: 0.51 µm), and SPS-100F (product name, zinc stearate, number average primary particle diameter: 0.5 µm).

In the present invention, it is preferable that a total content of the external additive is 1.6 to 4.0 parts by mass with respect to 100 parts by mass of the colored resin particles. If the total content of the external additive is less than 1.6 parts by mass, the toner after transfer may be remained. If the total content of the external additive exceeds 4.0 parts by mass, fog may occur.

A total content of the external additive is preferably 1.7 to 3.9 parts by mass, more preferably 2.0 to 3.0 parts by mass with respect to 100 parts by mass of the colored resin particles.

The silica fine particles A containing a specific amount of sodium element are used, whereby the toner of the present invention has an excellent balance between low-temperature fixability and heat-resistant shelf stability as well as good conveyance amount stability and printing durability, and reduces the occurrence of fog in a high temperature and high humidity environment.

EXAMPLES

Hereinafter, the present invention will be described further in detail with reference to examples and comparative examples. However, the scope of the present invention may not be limited to the following examples. Herein, "part(s)" and "%" are based on mass if not particularly mentioned.

Test methods used in the examples and the comparative examples are as follows.

1. Production of Silica Fine Particles

Production Example 1

1-1. Preparation of Silicic Acid Solution 14 kg of sodium silicate (No. 3 water glass) having a concentration of 4.7% was passed through an extra module (SIP-1013, manufactured by Asahi Kasei Corporation). Filtered water was recovered to obtain purified water glass. Pure water was added to the purified water glass so as to have a silica concentration of 5%. Then, 13 kg of water glass having a silica concentration of 5% was passed through 2.2 L of strongly acidic cation exchange resin (SK1BH, manufactured by Mitsubishi Chemical Corporation) at a space velocity of 3.1 to obtain a silicic acid solution (13.3 kg). The silica concentration of the obtained silicic acid solution was 4.7%.

1-2. Preparation of Silica Fine Particle Dispersion as Starting Material (Silica Sol)

To 67.2 g of sodium silicate (No. 3 water glass, $SiO_2$ concentration: 24.68%), 839.5 g of pure water was added to prepare dilute water glass having a silica concentration of 1.8%. Then, 6.3 g of the silicic acid solution having a silica concentration of 4.7% was added to the resultant mixture and stirred, followed by increasing the temperature to 79° C. The mixture was kept at 73° C. for 30 minutes and 6162.9 g of the silicic acid solution having a silica concentration of 4.7% was added thereto over a period of 22 hours. After the end of addition, the mixture was kept at 79° C. for 1 hour and then cooled to room temperature to obtain a silica sol. The obtained silica sol was concentrated using an ultrafiltration membrane (SIP-1013, manufactured by Asahi Kasei Corporation.) until the silica concentration reach 12%. After that, the sol was concentrated to 20% in a rotating evaporator.

1-3. Preparation of Silica Fine Particles

The obtained silica sol having a concentration of 20% was passed through, a cation exchange resin in the same manner as when preparing a silicic acid solution, followed by drying to obtain silica fine particles. For the average primary particle diameter of the silica fine particles, the particle diameter of 100 particles was measured by SEM observation and the average was calculated. As a result, the average was 100 nm.

1-4. Surface Treatment

The obtained silica fine particles were placed in a container, a small amount of water was added thereto. The container was sealed and stored at 50° C. for 20 hours. The container was cooled to 25° C. Then, 100 parts of the silica fine particles, 4 parts of hexamethyldisilazane as a hydrophobizing agent, 1 part of 3-aminopropyltriethoxysilane as a positive charge-imparting agent, were added to the container, followed by hydrophobizing treatment at 50° C. for 48 hours. Thereafter, the container was opened and dried at 100° C. for 16 hours. The obtained silica fine particles 1 had a number average primary particle diameter of 100 nm, a ratio of sodium of 0.71%, and a moisture absorption amount of 0.8% by mass.

Production Examples 2 to 6

Silica fine particles 2 to 5 and 8 were produced in the same step as in Production example 1 except that the space velocity of the passing liquid rate of the silica sol to the cation exchange resin as well as the added amounts of surface treatment agents (a hydrophobizing agent and a positive charge-imparting agent) were changed as shown in Table 1 in Production example 1. The characteristics of the obtained silica fine particles 1 to 5 and 8 are shown in Table 1.

2. Evaluation of Physical-Properties of Silica Fine Particles

The physical properties of the silica fine particles 1 to 5 and 8 were examined. The details are as follows. The evaluation results are shown in Table 1.

2-1. Measurement of Particle Diameter

A field emission scanning electron microscope (product name: S-4700, manufactured by Hitachi High-Technologies Corporation) was used to measure the number average primary particle diameter of silica fine particles.

100 silica fine particles were observed under the microscope. The particle diameters of the particles were determined by the images, and the average of the particle diameters was referred to as the average particle diameter of the silica fine particles.

2-2. Measurement of Sodium to Silicon Ratio

A scanning X-ray fluorescence spectrometer (product name: ZSX PrimusII, manufactured by Rigaku Corporation) was used to measure the amount of sodium element and the amount of silicon element in the silica fine particles.

Based on the obtained mass percent of the silicon and sodium, the sodium to silicon ratio in the silica particles was calculated according to the following formula:

Ratio of sodium (% by mass)={(sodium % by mass)/(silicon % by mass)}×100

2-3. Measurement of Moisture Absorption Amount

The moisture absorption amount was measured using the Moisture Sorption Analyzer (product name: IGA SORP, manufactured by Hiden Analytical).

Specifically, a silica fine particle sample to be measured was charged to the analyzer, and the moisture was absorbed to the silica fine particles by circulating air having a temperature of 30° C. and a humidity of 80% for 1.5 hours.

Then, the mass of the moisture absorbed silica fine particles was measured. Thereafter, the silica fine particles were dried by circulating dry nitrogen having a temperature of 30° C. for 1.5 hours. Then, the mass of the dry silica fine particles were measured. The moisture absorption amount was calculated by the following formula:

Moisture absorption amount (%) [{(mass of moisture absorbed silica fine particles)−(mass of dry silica fine particles)}/(mass of dry silica fine particles)]=×100

The characteristics of silica fine particles 1 to 5, 8 and silica fine particles 6 (product name: NipsilE-200, manufactured by Tosoh Silica Corporation), silica fine particles 7 (product name: UFP-30H, manufactured by Denka Company Limited) and silica fine particles 9 (product name: HDK H05TA, manufactured by Clariant) are summarized in Table 1 below. The manufacturing conditions of the silica fine particles 1 to 5 and 8, are also shown in Table 1.

The polymerizable monomer composition was charged into the above-obtained magnesium hydroxide colloid dispersion and agitated until the droplets were stable at room temperature. 4.4 parts of t-butylperoxy-2-ethylbutanoate (product name: Trigonox 27, manufactured by Kayaku-AKZO-Corporation) as a polymerization initiator was added thereto. The dispersion containing the polymerization initiator was subjected to a high shear agitation at 15,000 rpm by means of an in-line type emulsifying and dispersing machine (product name: MILDER MDN303V; manufactured by Pacific Machinery & Engineering Co., Ltd). Thus, droplets of the polymerizable monomer composition were formed.

The suspension having the above-obtained droplets of the polymerizable monomer composition dispersed (a polymerizable monomer composition dispersion) was charged into a reactor furnished with an agitating blade and the temperature thereof was raised to 90° C. to start a polymerization

TABLE 1

| | | Silica 1 | Silica 2 | Silica 3 | Silica 4 | Silica 5 | Silica 6 | Silica 7 | Silica 8 | Silica 9 |
|---|---|---|---|---|---|---|---|---|---|---|
| Ion exchange condition | Space velocity of the passing liquid rate of the silica sol to the cation exchange resin | 3.1 | 3.1 | 3.1 | 6.0 | 6.0 | — | — | 15 | — |
| Surface treatment condition | Hexamethyldisilazane added amount (part) | 4 | 2 | 6 | 4 | 8 | — | — | 6 | — |
| | 3-aminopropyl triethoxysilane added amount (part) | 1 | 2 | 0.8 | 2 | 0.6 | — | — | 0.8 | — |
| Property | Number average primary particle diameter (nm) | 100 | 100 | 100 | 100 | 100 | 300 | 110 | 100 | 50 |
| | Na ratio (mass %) | 0.71 | 0.71 | 0.70 | 1.39 | 1.38 | 1.91 | 0.00 | 2.21 | 0.00 |
| | Moisture absorption amount (mass %) | 0.8 | 1.6 | 0.5 | 1.7 | 0.9 | 2.2 | 0.2 | 1.5 | 0.3 |

3. Production of Toner

Example 1

75 parts of styrene and 25 parts of n-butyl acrylate as polymerizable monomers and 7 parts of carbon black (product name: #25B; manufactured by Mitsubishi Chemical Corporation) as a black colorant were dispersed using a disperser (product name: DYNO-MILL, Shinmaru Enterprises Corporation) to obtain a polymerizable monomer mixture.

To the polymerizable monomer mixture, 2.3 parts of a charge control resin (styrene acrylic resin having a quaternary ammonium group) as a charge control agent, 5 parts of a fatty acid ester wax as a release agent, 5 parts of a paraffin wax, 0.3 part of a polymethacrylic acid ester macromonomer (product name: AA6, manufactured by TOAGOSEI CO., LTD) as a macromonomer, 0.6 part of divinylbenzene as a crosslinkable polymerizable monomer, and 1.5 parts of t-dodecyl mercaptan as a molecular weight modifier were added. The mixture was mixed and dissolved to prepare a polymerizable monomer composition.

Separately, in an agitating chamber, an aqueous solution containing 6.2 parts of sodium hydroxide dissolved in 50 parts of ion-exchanged water was gradually added to an aqueous solution containing 10.2 parts of magnesium chloride dissolved in 250 parts of ion-exchanged water at room temperature while agitating to prepare a magnesium hydroxide colloid dispersion.

reaction. When the polymerization conversion reached almost 100%, 1 part of methyl methacrylate (a polymerizable monomer for shell) and 0.3 part of 2,2'-azobis (2-methyl-N-(2-hydroxyethyl)-propionamide) (a polymerization initiator for shell; product name: VA-086; manufactured by Wako Pure Chemical Industries, Ltd.; water-soluble) dissolved in 20 parts of ion-exchanged water were added into the reactor. After continuing the polymerization for 4 hours at 90° C., the reactor was cooled by water to stop the reaction. Thus, an aqueous dispersion of colored resin particles was obtained.

The above-obtained aqueous dispersion of colored resin particles was subjected to acid washing, in which sulfuric acid was added dropwise to be pH of 6.5 or less while agitating at room temperature. Then, separation by filtration was performed, and thus a solid content was obtained. After 500 parts of ion-exchanged water was added to the solid content to make a slurry again, a water washing treatment (washing, filtration and dehydration) was performed several times. Next, separation by filtration was performed and the thus-obtained solid content was placed in a container of a dryer for drying at 40° C. for 24 hours. Thus, the resulting colored resin particles had a volume average particle diameter Dv of 7.9 µm, a particle size distribution Dv/Dn of 1.13 and an average degree of circularity of 0.986.

To 100 parts of the obtained colored resin particles, 1.5 parts of the silica fine particles 1 obtained in Production example 1, 0.7 part of silica fine particles b1 (product name:

TG-7120, manufactured by Cabot, sodium ratio: 0% by mass) having a number average primary particle diameter of 20 nm which had been hydrophobized, 0.2 part of zinc stearate particles c1 (product name: SPS-100F, manufactured by Sakai Chemical Industry Co., Ltd.) having a number average primary particle diameter of 500 nm were added to mix by means of a high speed agitator (product name: FM mixer, manufactured by NIPPON COKE & ENGINEERING. CO., LTD.) and the external additives were externally added. Thus, a toner of Example 1 was produced. The test results are shown in Table 2.

Examples 2 to 9 and Comparative Examples 1 to 4

Toners of Examples 2 to 9 and Comparative examples 1 to 4 were produced similarly as in Example 1 except that the external additive was changed as shown in Table 2 in Example 1. Incidentally, in Table 2, "silica b2" represent silica fine particles b2 having a number average primary particle diameter of 20 nm (product name: NA130Y, manufactured by Nippon Aerosil Co., Ltd., sodium ratio: 0% by mass). In Table 2, "particles c1" represent the sine stearate particles c1 described above.

4. Evaluation of Characteristics of Colored Resin Particles and Toners

Characteristics of the toners of Examples 1 to 9 and Comparative examples 1 to 4 and colored resin particles used for the toners were examined. The details are as follows. The evaluation results are shown in Table 2.

(1) Measurement of Particle Diameter of Colored Resin Particles

The volume average particle diameter Dv, number average particle diameters Dn, and particle size distribution Dv/Dn of the colored resin particles were measured with a particle diameter measuring device (product name: MULTISIZER; manufactured by Beckman Coulter, Inc.) The measurement using the MULTISIZER was conducted under the conditions of: aperture diameter: 100 μm; dispersion medium: ISOTON II (product name); concentration: 10%; and number of the measured particles: 100,000.

Specifically, 0.2 g of a colored resin particle sample was placed in a beaker. Then, an aqueous solution of alkyl benzene sulfonate (product name: DRIWEL; manufactured by FUJIFILM Corporation) was added therein as a dispersant. Further, 2 mL of the dispersion medium was added to the beaker to allow the colored resin particles to foe wet. Then, 10 mL of the dispersion medium was added thereto and dispersed with an ultrasonic disperser for 1 minute. After that, the measurement using the particle diameter measuring device was performed.

(2) Average Circularity

The average circularity of colored resin particles is a value obtained by measuring the particles in an aqueous dispersion using a flow-type particle image analyzer (FPIA-1000; manufactured by Sysmex Corporation). In the measurement method, 10 mL of ion exchange water was previously poured into a container. Alkylbenzene sulfonate as a dispersant was added thereto and 0.2 g of measurement sample was added thereto. Then, the resultant mixture was dispersed uniformly. Then, dispersion treatment was performed by means of an ultrasonic disperser at 60 W for 3 minutes. The colored resin particles for measurement were adjusted to have a concentration of 3,000 to 10,000 particles/μL. The circularity of 1,000 to 10,000 colored resin particles was measured. This data was used to calculate the average circularity.

(3) Minimum Fixing Temperature

A commercially-available, non-magnetic one-component development printer which was refurbished so that the temperature of a fixing roller of the printer was changed, was used for a fixing test. In the fixing test, a solid patterned image with 100% image density was printed, the; temperature of the fixing roller in the refurbished printer was changed by 5° C., and then the fixing rate of the toner was measured at each temperature to determine the relationship between the temperature and fixing rate. A tape was removed in the area of the solid patterned image (100% image density), and the fixing rate was calculated from the ratio of image densities before and after removing the tape. In particular, if the image density before removing the tape is referred to as ID (before) and the image density after removing the tape is referred to as ID (after), the fixing rate can be calculated from the following calculation formula 4:

Fixing rate (%)=(ID (after)/ID (before))×100   Calculation formula 4

Tape removing operation means a series of operations including: attaching an adhesive tape (product name: SCOTCH MENDING TAPE 810-3-18; manufactured by Sumitomo 3M Limited) to a measuring part of a test paper; sticking the adhesive tape by pressure at a constant pressure; and removing the adhesive tape in a direction along the paper at a constant rate. The image density was measured by means of a reflection densitometer (product name: RD914, manufactured by Macbeth). In the fixing test, the minimum fixing roller temperature at which the fixing rate exceeds 80% was referred to as the minimum fixing temperature of the toner, (4) Heat-resistant Shelf Stability 10 g of toner was placed in a 100 mL sealable polyethylene container and the container was sealed. Then, the container was set in a constant temperature water bath which was set to a temperature of 55° C. After 8 hours, the container was removed from the constant temperature water bath. The toner in the container was put on a 42-mesh sieve. At this time, the toner was gently removed from the container and carefully put on the sieve so as not to destroy the aggregation structure of the toner in the container. The sieve on which the toner was put was vibrated for 30 seconds under the condition of amplitude of 1 mm by means of a powder characteristic tester (product name: POWDER TESTER PT-R; manufactured by Hosokawa Micron Corporation). Thereafter, the mass of the toner remained on the sieve was measured, and the thus-measured toner was referred to as an aggregated toner mass. Incidentally, the measurement was performed 3 times per sample, and the average was defined as an indicator of heat-resistant shelf stability.

(5) Blowoff Charge Amount 9.5 g of a carrier particle (product name: NZ-3; manufactured by Powdertech Corporation) and 0.5 g of a sample were weighed and charged in a 100-cc glass bottle, and the bottle was rotated at 150 rpm for 30 minutes. Thereafter, the blowoff charge amount was measured by blowing nitrogen gas at a pressure of 4.5 kPa and aspirating the gas at a pressure of 9.5 kPa using a blowoff meter (product name: TB-203, manufactured by KYOCERA Chemical Corporation).

The measurement was carried out at a temperature of 23° C. and a relative humidity of 50%.

5. Evaluation of Printing Characteristics of Toner

The printing characteristics of the toners of Examples 1 to 9 and Comparative examples 1 to 4 were examined. The details are as follows. The evaluation results are shown in Table 2.

(1) Printing Durability

In a printing durability test, a commercially-available, non-magnetic one-component development printer (printing speed: 20 A4 sheets/min) was used. The toner was charged into the toner cartridge of the development device, and then printing sheets were set in the device.

After being left in a normal temperature and normal humidity (N/N) environment at a temperature of 23° C. and a humidity of 50% for 24 hours, in the same environment, 15,000 printing sheets were continuously printed at an image density of 5%.

Black solid pattern printing (100% image density) was performed on 500 printing sheets, and the image density of the black solid pattern printed image was measured by means of a reflection densitometer (product name: RD918, manufactured by Macbeth). Thereafter, white solid pattern (0% image density) was printed, and the printer was stopped in the middle of the white solid pattern printing. An adhesive tape (product name: Scotch Mending Tape 810-3-18, manufactured by Sumitomo 3M Limited) was attached to the toner in a non-image area on the photoconductor after development. Then, the tape was removed therefrom and attached to a printing sheet. Thereafter, a whiteness degree (B) of the printing sheet, on which the adhesive tape had been attached, was measured by means of a whiteness meter (product name: ND-1, manufactured by Nippon Denshoku Industries Co., Ltd.). Only an unused adhesive tape was attached on the printing sheet to measure a whiteness degree (A) thereof likewise. A difference (B-A) between these whiteness degrees was regarded as a fog value. The smaller value indicates that fog is less, and image quality is better.

The number of printing sheets, on which the continuous printing could be conducted while retaining such image quality that the image density is 1.3 or higher, and the fog value is 3 or lower, was determined. Incidentally, there is a need for toners to have printing durability that the number of continuous printing sheets is 10,000 or more.

In Table 2, "15000<" indicates that such image quality (image density is 1.3 or more, and the fog value is 3 or less) was retained even at the time of printing 15,000 sheets.

(2) Conveyance Amount Stability (i) Measurement of Early-stage Conveyance Amount (M/A)

After the printing durability test on 500 sheets was completed during the test, white solid pattern was printed on a first printing sheet. Then, white solid pattern was printed on a second sheet and printing was stopped in the middle. After that, the charge amount (µC/g) of the toner attached on the developing roll was measured using a suet ion-type charge amount measurement device (product name: 210HS-2A, manufactured by TREK Japan KK).

Based on the area of the suctioned toner and the mass of the toner captured by the suction-type charge amount measurement device, the early-stage conveyance amount was calculated from Calculation formulae 1 and 2:

area on developing roll=(radius of suction trace)$^2$×Π×number of suction traces     Calculation formula 1 conveyance amount on developing roll=mass of captured toner/area on developing roll     Calculation formula 2

(ii) Measurement of Middle-stage and End-stage Conveyance Amounts

The middle-stage conveyance amount after the end of the printing durability test on 7,000 sheets was calculated in the same manner as in (i) and further the end-stage conveyance amount when the printing durability test was terminated was calculated.

(iii) Calculation of Conveyance Amount Stability

Based on the measurement results in (i) and (ii), the conveyance stability at middle- and end-stages was calculated from Calculation formulae 3a and 3b as described above.

middle-stage conveyance amount stability=middle-stage conveyance amount/early-stage conveyance amount     Calculation formula 3a end-stage conveyance amount stability=end-stage conveyance amount/early-stage conveyance amount     Calculation formula 3b (3) Fogging in H/H Environment The toner to be evaluated were left for a whole day and night in a high temperature and high humidity (H/H) environment at a temperature of 35° C. and a humidity of 80%, and then the non-magnetic one-component development printer was used to print white solid pattern in the same manner as in the above printing durability test. The fog in the H/H environment was measured.

The evaluation results of the toners of Examples 1 to 9 and Comparative examples 1 to 4 are shown in Table 2 below together with the kind of each of the external additives. Incidentally in Table 2, the silica fine particles 6 to 9 whose odium to silicon ratio used for the toner of Comparative example does not correspond to a sodium to silicon ratio of 0.1 to 1.8% by mass are described as alternatives for comparison to the silica fine particles A.

TABLE 2

|  |  |  | Example 1 | Example 2 | Example 3 | Example 4 | Example 5 | Example 6 |
|---|---|---|---|---|---|---|---|---|
| external additive | Silica fine particles A (Alternative) | Type | Silica 1 | Silica 1 | Silica 1 | Silica 2 | Silica 2 | Silica 3 |
|  |  | Number average primary particle diameter (nm) | 100 | 100 | 100 | 100 | 100 | 100 |
|  |  | Na ratio (mass %) | 0.71 | 0.71 | 0.71 | 0.71 | 0.71 | 0.70 |
|  |  | Moisture absorption amount (mass %) | 0.8 | 0.8 | 0.8 | 1.6 | 1.6 | 0.5 |
|  |  | Added amount (part) | 1.5 | 0.8 | 3.0 | 1.5 | 1.5 | 1.5 |
|  | Silica fine particles B | Type | Silica b1 | Silica b1 | Silica b1 | Silica b1 | Silica b2 | Silica b1 |
|  |  | Number average primary particle diameter (nm) | 20 | 20 | 20 | 20 | 20 | 20 |
|  |  | Added amount (part) | 0.7 | 0.7 | 0.7 | 0.7 | 0.7 | 0.7 |

TABLE 2-continued

|  |  |  | | | | | | |
|---|---|---|---|---|---|---|---|---|
| | fatty acid metal salt particles C | Type | Particle c1 | Particle c1 | Particle c1 | Particle c1 | Particle c1 | Particle c1 |
| | | Number average primary particle diameter (nm) | 500 | 500 | 500 | 500 | 500 | 500 |
| | | Added amount (part) | 0.2 | 0.2 | 0.2 | 0.2 | 0.2 | 0.2 |
| | | Total added amount (part) | 2.4 | 1.1 | 3.9 | 2.4 | 2.4 | 2.4 |
| Toner property | | Minimum fixing temperature (° C.) | 145 | 140 | 155 | 145 | 145 | 145 |
| | | Heat-resistant shelf stability (g) | 0.1 | 1.8 | 0.1 | 0.1 | 0.1 | 0.1 |
| | | Charge amount ($\mu$C/g) | 106 | 114 | 95 | 97 | 96 | 101 |
| Printing property | | Printing Durability (sheets) | 15000< | 15000< | 15000< | 15000< | 15000< | 15000< |
| | | Middle-stage conveyance amount stability | 1.09 | 1.71 | 1.08 | 1.11 | 1.24 | 1.17 |
| | | End-stage conveyance amount stability | 1.45 | 1.97 | 1.54 | 1.47 | 1.77 | 1.93 |
| | | HH initial fog | 0.8 | 1.0 | 1.5 | 1.3 | 0.9 | 0.6 |

| | | | Example 7 | Example 8 | Example 9 | Comparative Example 1 | Comparative Example 1 | Comparative Example 1 | Comparative Example 1 |
|---|---|---|---|---|---|---|---|---|---|
| external additive | fine silica particle A (Alternative) | Type | Silica 4 | Silica 9 | Silica 1 | Silica 6 | Silica 7 | Silica 8 | Silica 9 |
| | | Number average primary particle diameter (nm) | 100 | 100 | 100 | 300 | 110 | 100 | 50 |
| | | Na ratio (mass %) | 1.39 | 1.38 | 0.71 | 1.91 | 0.00 | 2.21 | 0 |
| | | Moisture absorption amount (mass %) | 1.7 | 0.9 | 0.8 | 2.2 | 0.2 | 1.5 | 0.3 |
| | | Added amount (part) | 1.5 | 1.5 | 1.5 | 1.5 | 1.5 | 1.5 | 1.5 |
| | Silica fine particles B | Type | Silica b1 | Silica b1 | Silica b1 | Silica b1 | Silica b1 | Silica b1 | Silica b1 |
| | | Number average primary particle diameter (nm) | 20 | 20 | 20 | 20 | 20 | 20 | 20 |
| | | Added amount (part) | 0.7 | 0.7 | 0.7 | 0.7 | 0.7 | 0.7 | 0.7 |
| | fatty acid metal salt particles C | Type | Particle c1 | Particle c1 | — | Particle c1 | Particle c1 | Particle c1 | Particle c1 |
| | | Number average primary particle diameter (nm) | 500 | 500 | — | 500 | 500 | 500 | 500 |
| | | Added amount (part) | 0.2 | 0.2 | — | 0.2 | 0.2 | 0.2 | 0.2 |
| | | Total added amount (part) | 2.4 | 2.4 | 2.2 | 2.4 | 2.4 | 2.4 | 0.4 |
| Toner property | | Minimum fixing temperature (° C.) | 145 | 145 | 140 | 145 | 150 | 145 | 153 |
| | | Heat-resistant shelf stability (g) | 0.1 | 0.6 | 0.1 | 0.2 | 0.1 | 0.1 | 0.1 |
| | | Charge amount ($\mu$C/g) | 80 | 74 | 115 | 79 | 169 | 60 | 118 |
| Printing property | | Printing Durability (sheets) | 14000 | 11000 | 13000 | 8000 | 7000 | 10000 | 3000 |
| | | Middle-stage conveyance amount stability | 1.06 | 1.15 | 1.06 | 2.07 | 2.37 | 1.09 | 1.93 |
| | | End-stage conveyance amount stability | 1.59 | 1.47 | 1.39 | 2.35 | — | 1.4 | — |
| | | HH initial fog | 1.4 | 1.2 | 1.4 | 3.7 | 0.3 | 0.3 | 0.2 |

6. Evaluation of Toner

Hereinafter, the evaluation results of the toners will be examined with reference to Table 2.

Table 2 shows that the silica fine particles 8 used for the toner of Comparative example 3 have a sodium to silicon ratio of 2.21% by mass.

Table 2 shows that the toner of Comparative example 3 has a minimum fixing temperature of 145° C., an average mass of aggregated toner of 0.1 g, a number of sheets for evaluation of printing durability of the toner of 10,000 sheets, a value of middle-stage conveyance amount stability of 1.09 and a value of the end-stage conveyance amount stability of 1.40. Therefore, as for the toner of Comparative example 3, there is no problem with at least low-temperature fixability, heat-resistant shelf stability, printing durability and conveyance amount stability.

However, the toner of Comparative example 3 has a low charge amount (68 $\mu$C/g) and a high fog value in the H/H environment (5.3). Particularly, the fog value in the H/H environment of Comparative example 3 is the highest among the toners evaluated this time. Similarly, in the toner of Comparative example 1 prepared by using the silica fine particles 6 having a sodium to silicon ratio of 1.91% by mass, the fog value in the H/H environment is as high as 3.7. This is considered due to the fact that the sodium to silicon ratio in the external additive is too high, whereby fog is likely to occur in a high temperature and high humidity environment.

Table 2 shows that the silica fine particles 9 used for the toner of Comparative example 4 does not contain sodium.

Table 2 shows that the toner of Comparative example 4 has a minimum fixing temperature of 155° C., an average mass of aggregated toner of 0.1 g, a charge amount of 118 µC/g and a fog value in the H/H environment of 0.2. Therefore, as for the toner of Comparative example 2, there is no problem with at least low-temperature fixability, heat-resistant shelf stability, charging ability and fog in a high temperature and high humidity (H/H) environment.

However, the number of sheets for evaluation of printing durability of the toner of Comparative example 4 is as low as 8,000 sheets, and the value of middle-stage conveyance amount stability is as high as 1.93. In Comparative example 4, the middle-stage conveyance amount stability is bad, and thus the end-stage conveyance amount stability is not evaluated. Similarly, in the toner of Comparative example 2 in which the silica fine particles 7 containing no sodium was used, the printing durability and conveyance stability are very bad. This is considered due to the fact that the sodium to silicon ratio in the external additive is too low and thus the conveyance stability is not excellent and the durability deteriorates.

On the other hand, as is clear from Table 2, the ratio of sodium as for the silica fine particles 1 to 5 used for the toners of Examples 1 to 9 is 0.70 to 1.39% by mass.

Table 2 shows that, as for the toners of Examples 1 to 9, the minimum fixing temperature is as low as 155° C. or less, the average mass of aggregated toner is 1.8 g or less, the charge amount of the toner is as high as 74 µC/g, the number of sheets for evaluation of printing durability of the toner is 11,000 sheets or more, the value of middle-stage conveyance amount stability is as low as 1.24 or less, the value of end-stage conveyance amount stability is as low as 1.97 or less and the fog value in the H/H environment is as low as 1.5 or less.

Therefore, it is found that the toner of the present invention comprising silica fine particles A having a sodium to silicon ratio of 0.1 to 1.8% by mass has an excellent balance between low-temperature fixability and heat-resistant shelf stability as well as good conveyance amount stability and printing durability, and causes less occurrence of fog in a high temperature and high humidity environment.

The invention claimed is:

1. A toner for developing electrostatic images, comprising colored resin particles containing a binder resin and a colorant, and an external additive,
   wherein silica fine particles A having a sodium to silicon ratio of 0.5 to 1.8% by mass, are contained as the external additive.

2. The toner for developing electrostatic images according to claim 1, wherein the silica fine particles A have a moisture absorption amount of 0.3 to 1.8% by mass.

3. The toner for developing electrostatic images according to claim 1, wherein the silica fine particles A have a number average primary particle diameter of 20 to 200 nm.

4. The toner for developing electrostatic images according to claim 3, wherein fatty acid metal salt particles C having a number average primary particle diameter of 100 to 2,000 nm, are further contained as the external additive.

5. The toner for developing electrostatic images according to claim 1, wherein surface-treated silica fine particles B having a number average primary particle diameter of 7 to 49 nm and a sodium to silicon ratio of 0% or more and less than 0.1% by mass, are further contained as the external additive.

6. The toner for developing electrostatic images according to claim 1, wherein a total content of the external additive is 1.6 to 4.0 parts by mass with respect to 100 parts by mass of the colored resin particles.

7. The toner for developing electrostatic images according to claim 1,
   wherein the colored resin particles are positively charged, and
   wherein the silica fine particles A are surface treated to be positively charged.

\* \* \* \* \*